Sept. 22, 1964 A. L. GOLDMAN 3,150,350

PARALLEL PARITY CHECKER

Filed Jan. 4, 1961 2 Sheets-Sheet 1

INVENTOR.
ALAN L. GOLDMAN

BY H. A. Mackey

ATTORNEY.

Sept. 22, 1964 A. L. GOLDMAN 3,150,350
PARALLEL PARITY CHECKER
Filed Jan. 4, 1961 2 Sheets-Sheet 2

INVENTOR.
ALAN L. GOLDMAN
BY H. S. Mackey
ATTORNEY.

United States Patent Office 3,150,350

Patented Sept. 22, 1964

3,150,350

PARALLEL PARITY CHECKER

Alan L. Goldman, Yonkers, N.Y., assignor to General Precision, Inc., a corporation of Delaware Filed Jan. 4, 1961, Ser. No. 80,565
6 Claims. (Cl. 340—146.1)

This invention relates to digital computers and digital data processing systems of the parallel type and more particularly to a parallel parity checking circuit which is capable of detecting an error in parity and provide an electric signal whenever an error in parity occurs.

In modern high speed digital logic circuits, digital data processing devices and digital computers, noise or other spurious signals will very often alter a number or code which is being processed. If this condition goes undetected, the results obtained will be inaccurate. One method for detecting the introduction of changes or errors in the transmission or processing of a number or code is the comparison technique in which a number in process is compared with itself. However, this technique requires storage which is not always available.

The parity check method, while not as reliable as the comparison techniques, is however, quite acceptable and provides a relatively inexpensive means for determining the accuracy obtained in the transmission and handling of a digital number or code. This method is implemented by making the sum of all the ones in a code equal to an even or an odd number. Thus, if a pulse or digit only is added or dropped, the sum of the ones, if odd parity check is used, will be even to indicate an error. If even parity is used, the sum of the ones will be odd when a single pulse or digit is added or lost. This method will not detect the loss or addition of two pulses or digits or the loss or addition of any even number of pulses or digits. However, the method has sufficient reliability and is in widespread current use. Reliability may be further improved if all zeros and all ones are eliminated as valid codes.

Notwithstanding the widespread use of the parity check method for detecting transmission errors, the overwhelming majority use a counter, in one form or another, for determining if the correct number of ones is present. While counters are less complex and costly than comparison and storage devices they are, nevertheless, complicated and relatively expensive. Furthermore, they consume power and generate heat which must be dissipated.

One object of this invention is to provide a parallel parity checker which has a small number of parts and is easily constructed from stock parts.

Another object of this invention is to provide a parity checker which is reliable in operation and consumes a small quantity of power.

A further object of this invention is to provide a parity checker which will operate without the complement of the number or code being checked.

Yet another object of this invention is to provide a parity checker which is inexpensive to construct and operate.

This invention contemplates a circuit for determining when a binary coded electric signal fails to fall within a preselected group of alternate integers and comprises, a plurality of means for detecting the presence of successive numbers of ones in the code being checked, and logical circuit means connected to said detecting means for comparing the outputs of preselected means and for supplying an output whenever the code being checked fails to fall within the preselected group of alternate integers.

The foregoing and other objects and advantages of this invention will appear more clearly from a consideration of the specification and drawings wherein several embodiments of the invention are described and shown in detail for illustration purposes only.

Figures 1, 2:
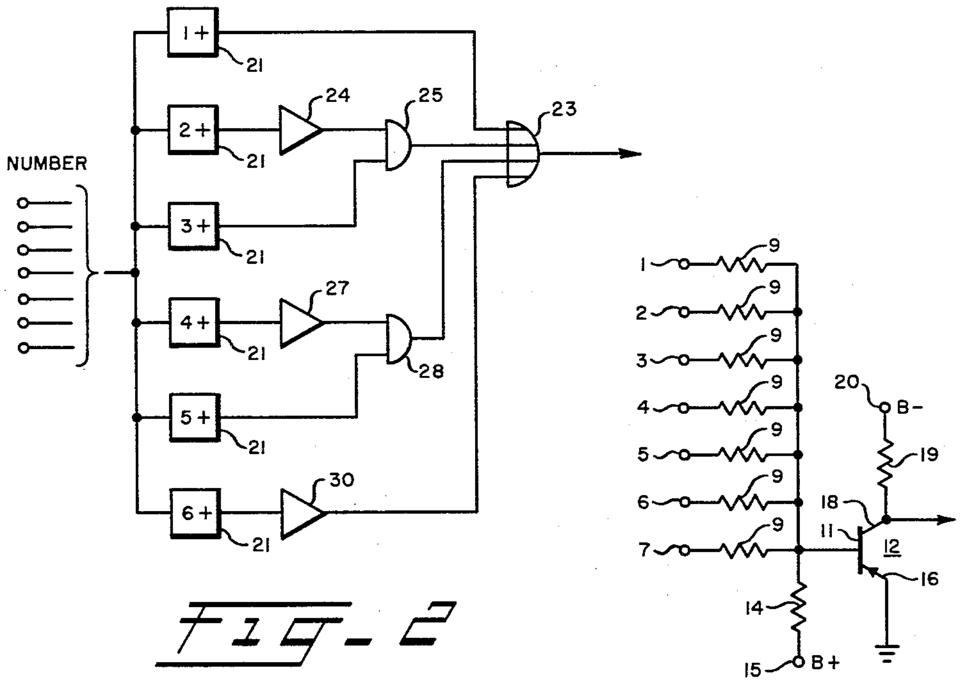
FIGURE 1 is a schematic diagram of a sensor as used in the invention.
FIGURES 2, 3, 4 and 5 are block diagrams of different embodiments of this invention.

In FIGURE 1 seven terminals numbered 1–7, inclusive, provide for connecting the sensor unit to seven parallel lines each of which carries one bit of the code which is to be checked. Each of the terminals is connected by a resistor 9 to the base 11 of a transistor 12. Base 11 is also connected to a positive voltage source B+ by a resistor 14 and a terminal 15. The emitter 16 of transistor 12 is connected directly to ground and the collector 18 is connected to a negative voltage source B— by a resistor 19 and a terminal 20.

Resistors 9 have identical values and resistors 9, 14 and 19 may be varied so that the output which is taken at collector 18 will be a function of the total number of terminals 1–7, inclusive, which are, with this circuit arrangement, negative. If positive logic is to be used, the transistor must be changed to an NPN and the voltages at terminals 15 and 20 must be reversed. Then the output taken at collector 18 will be a function of the total number of terminals 1–7, inclusive, which are positive. By varying the values of resistors 9, 14 and 19 the circuit illustrated may be made to provide a negative voltage when one or more inputs are negative, two or more inputs are negative, three or more inputs are negative, etc., through 7 inputs are negative. In the embodiments shown in FIGURES 2–5 a number of these sensor circuits are employed which provide outputs either negative or positive, depending on the type of logic used, for different numbers of inputs attaining a negative or positive value whichever the case may be. How these sensors are utilized will be pointed out in detail in connection with the descriptions of FIGURES 2–5.

In the descriptions which follow, no distinction will be made between negative or positive logic. The various bits of a coded electric signal will be referred to as being one or zero without regard to the actual voltage being used. Thus, if a negative logic sensor is constructed to provide zero voltage if two bits are negative; generic terminology will be employed and it will be described as providing a zero output if two or more bits are a one and a voltage output if less than two bits are one. In this way both the negative and positive logic embodiments are described.

In FIGURE 2, sensors 21 for detecting the presence of one or more, two or more, three or more, four or more, five or more, and six or more bits are connected to a source not shown, which contains the number whose parity is to be checked. These sensors have been labeled 1+, 2+, 3+, 4+, 5+ and 6+, respectively, to distinguish them from each other since, except for the values of resistors 9, 14 and 19, they are identical. The output from the 1+ sensor is connected directly to an "or" gate 23. The output from the 2+ sensor is inverted by an inverting amplifier 24 and applied to one input of an "and" gate 25, while the output of the 3+ sensor is applied to the other input of "and" gate 25. The output of gate 25 is connected to another input of "or" gate 23.

The 4+ sensor has its output inverted by an inverting amplifier 27 before being applied to one input of an "and" gate 28 and the 5+ sensor has its output connected to the other input of gate 28. Gate 28 has its output connected to another input of "or" gate 23. The output from the 6+ sensor is inverted by an inverting amplifier 30 and applied to the fourth input of "or" gate 23.

This circuit will detect an all zeros' output to the parallel connected sensors and it will also detect two ones, four ones, six ones and seven ones. In each instance it will provide a one output from "or" gate 23 to indicate a lack of parity. It will provide a zero output at gate 23 if the number applied to the sensors has one one, three ones or five ones since these are permissible codes in an odd parity check system.

With this circuit arrangement, all zeros at the inputs to the sensors will result in a one output at the 1+ unit, this will cause a one to appear at "or" gate 23 to indicate a lack of parity. A single one in the code applied to the sensors will cause the 1+ sensor to go to zero volts; the output of "and" gate 25 will be zero volts since the voltage from the 2+ unit after it is inverted becomes zero; the output of "and" gate 28 will be zero volts since the voltage from the 4+ unit after it is inverted becomes zero; and the inverted output of the 6+ unit is also zero.

A code with two ones will cause a one to appear at "or" gate 23 to indicate a lack of parity since the inverted output of the 2+ sensor and the output of the 3+ sensor and the output of the 3+ sensor are both one. A code with three ones will cause zero output from the 1+ sensor; a zero output from "and" gate 25 since the 3+ sensor will provide a zero output; a zero output from the gate 28 since the inverted output from the 4+ sensor is zero; and the inverted 6+ sensor output is also zero.

A code with four ones will cause a one to appear to "or" gate 23 to indicate a lack of parity since the inverted output of the 4+ sensor and the output of the 5+ sensor are both one. A code with five ones will have zero output since the 1+ sensor output will be zero; "and" gate 25 will have zero output as the 3+ output is zero; "and" gate 28 will have zero output since the 5+ sensor output is zero; and the inverted 6+ sensor's output will also be zero. Numbers or codes having six or seven ones will provide a one output since the inverted 6+ sensor output will be a one.

The embodiment described above is particularly useful in those instances where the number or the code only is available. If, however, the complement is also available, the embodiment shown in FIGURE 3 may be used to advantage since a 4+ sensor is the largest number of ones that need be detected. It should be pointed out at this time that 5+, 6+ and 7+ sensors require the use of resistors having closer tolerances and it might be necessary to use ±5% resistors in the 5+ or greater sensors while ±10% resistors are quite suitable in a 4+ or smaller sensor.

Figure 3:
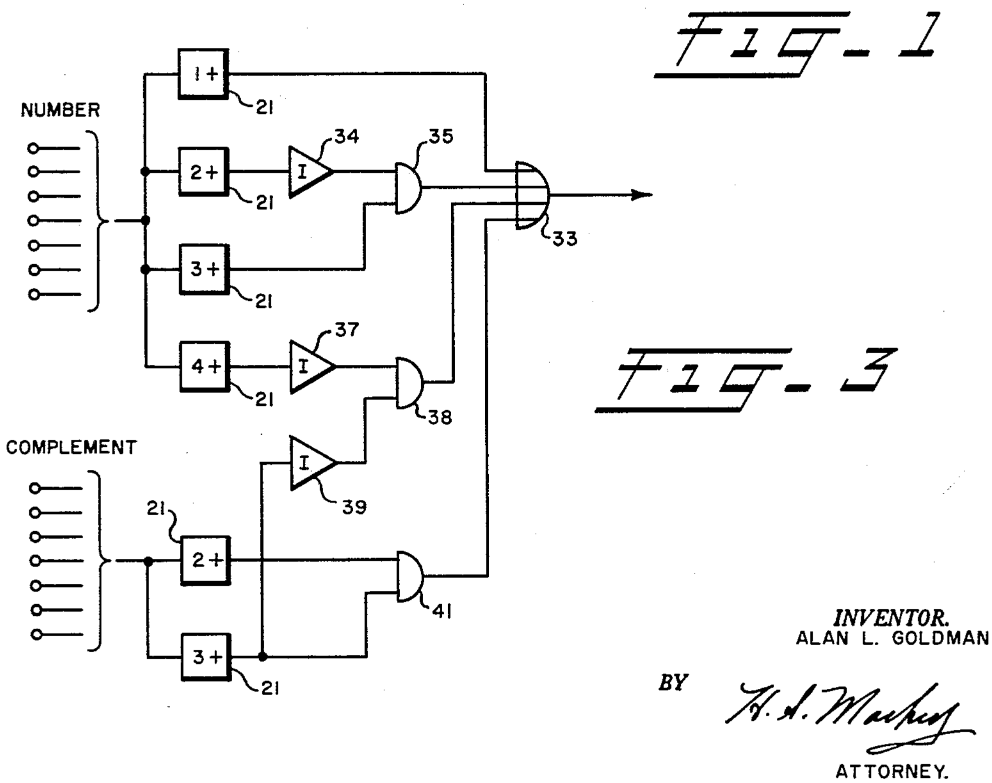

In FIGURE 3, 1+, 2+, 3+ and 4+ sensors are connected in parallel to a source containing the number or code which is to be parity checked and additional 2+ and 3+ sensors are connected to a source containing the complement of the number or code which is to be parity checked. The 1+ sensor connected to the number source has its output connected directly to one input of an "or" gate 33 and provides an output for indicating a lack of parity whenever the number or code is all zeros and contains no ones. The 2+ sensor connected to the number source has its output inverted by an inverting amplifier 34 and connected to one input of an "and" gate 35 while the other input of "and" gate 35 is connected to the output of the 3+ sensor connected to the number source. The output of "and" gate 35 is connected to another input of "or" gate 33 and provides an output for indicating a lack of parity whenever the number or code has two ones only which in the case of an odd parity checking system indicates an error or lack of parity.

The 4+ sensor connected to the number source has its output inverted by an inverting amplifier 37 which has its output connected to one input of an "and" gate 38 and the 3+ sensors which is connected to the complement source has its output inverted by an inverting amplifier 39 which has its output connected to the other input of gate 38. The output of gate 38 is connected to a third input of "or" gate 33 and provides an output for indicating a lack of parity whenever the number or code has four ones.

A second 2+ sensor is connected to the complement source and has its output connected to one input of an "and" gate 41 while the other input of "and" gate 41 is connected to the 3+ sensor which has its input connected to the complement source. The output of "and" gate 41 is connected to an input of "or" gate 33 and provides an output for indicating a lack of parity whenever the number or code has six or seven ones. If the number or code has one one, three ones or five ones, then there will be no output at "or" gate 33 which indicates that the number or code is accurate.

Figure 4:
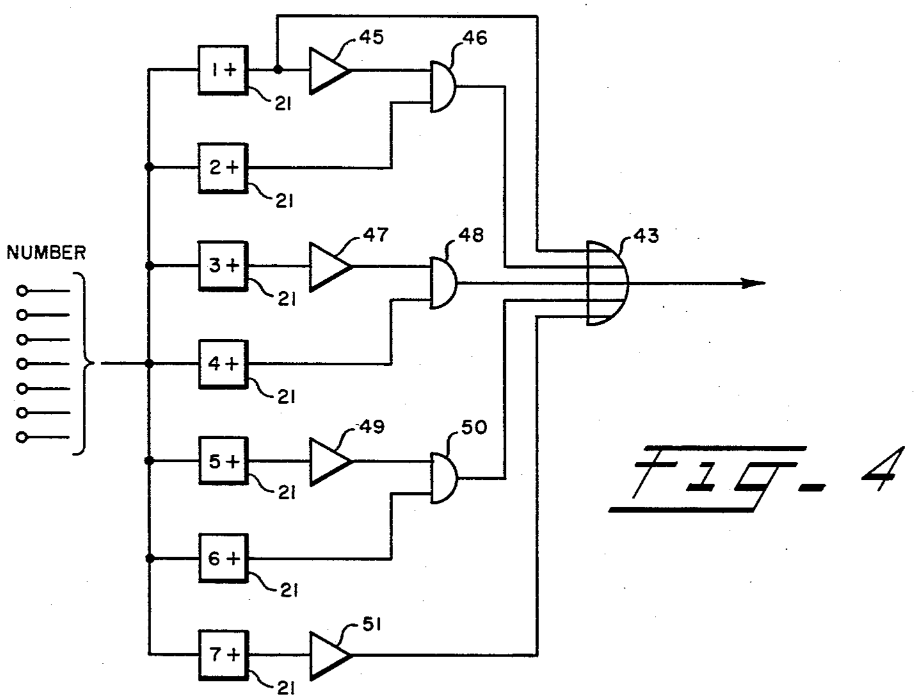
Figure 5:
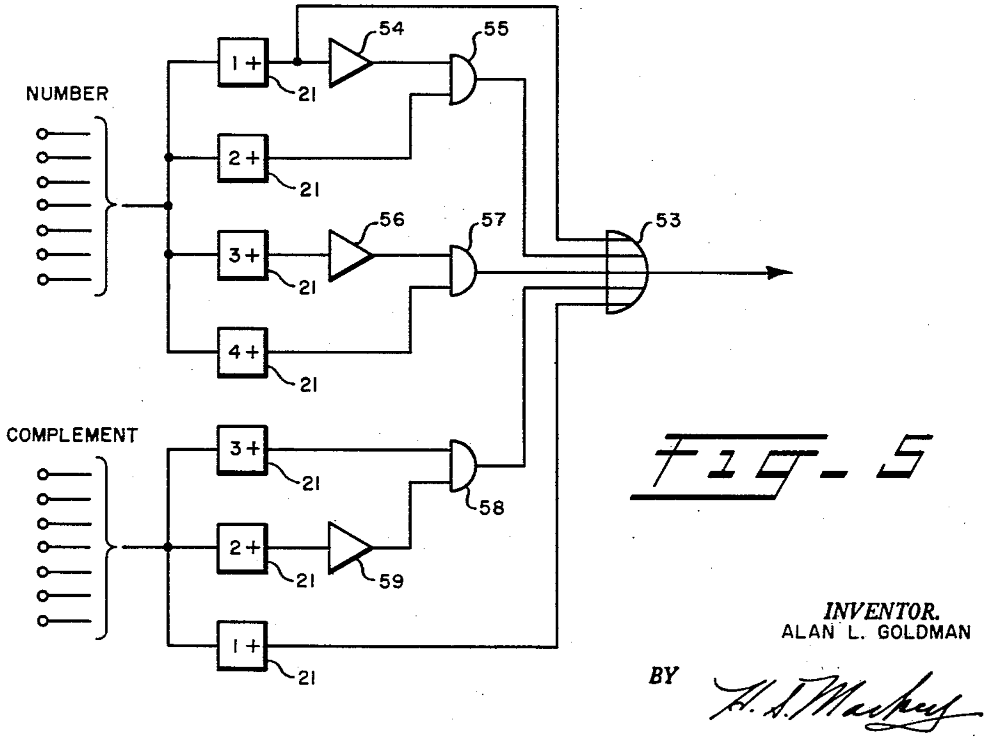

FIGURES 4 and 5 show circuits which are suitable for checking a number or code which employs even parity check. These circuits are functionally identical and correspond to FIGURES 2 and 3, respectively. Both of these circuits will provide an output for indicating a lack of parity whenever the number or code being checked has no ones, one one, three ones, five ones, or seven ones. If the number or code has two, four or six ones it checks in parity and no output is provided.

In FIGURE 4, 1+, 2+, 3+, 4+, 5+, 6+ and 7+ sensors are connected in parallel to a source, not shown, which contains the number or code to be parity checked. The output from the 1+ sensor is connected directly to one input of an "or" gate 43 and provides an output for indicating a lack of parity when the number has all zeros and no ones. It is also inverted by an inverting amplifier 45 and applied to one input of an "and" gate 46 which has its other input connected to the output from the 2+ sensor. The output of gate 46 is connected to "or" gate 43 and provides a voltage output for indicating a lack of parity whenever the number has one one only.

The output from the 3+ sensor is inverted in an inverting amplifier 47 and applied to one input of an "and" gate 48 which has its other input connected to the output of the 4+ sensor. Gate 48 has its output connected to "or" gate 43 and provides a voltage output for indicating a lack of parity whenever the number has three ones only. The output from the 5+ sensor is inverted in an inverting amplifier 49 and applied to one input of an "and" gate 50 which has its other input connected directly to the output of the 6+ sensor. Gate 50 has its output connected to "or" gate 43 and provides a voltage output for indicating a lack of parity whenever the number has five ones only. The output of 7+ sensor is inverted by an inverting amplifier 51 and applied to "or" gate 43 to provide a voltage output for indicating a lack of parity whenever the number has seven ones. When the number has two, four or six ones only no output is provided at "or" gate 43 since these are proper combinations in an even parity check system.

In FIGURE 5, 1+, 2+, 3+ and 4+ sensors are connected in parallel to a source, not shown, which contains the number to be parity checked, and additional 1+, 2+ and 3+ sensors are connected to a source, not shown, which contains the complement of the number which is to be parity checked. The output from the 1+ sensor connected to the number source is connected directly to one input of an "or" gate 53 and provides an output for indicating a lack of parity whenever the number being checked has no ones. It is also inverted by an inverting amplifier 54 and applied to one input of an "and" gate 55 which has its other input connected to the output from the 2+ sensor which is connected to the number source. The output of gate 55 is connected to "or" gate 53 and provides a voltage output for indicating a lack of parity when the number being checked has only a single one.

The output from the 3+ sensor which is connected to the number source is inverted by an inverting amplifier 56 and applied to one input of an "and" gate 57 which has its other input connected directly to the output from the 4+ sensor which is connected to the number source.

The output from gate 57 is connected to "or" gate 53 and provides an output voltage which indicates a lack of parity whenever the number being checked has only three ones.

The 3+ sensor connected to the complement supply has its output connected to one input of an "and" gate 58 which has its other input connected by an inverting amplifier 59 to the output of the 2+ sensor which is connected to the complement source. Gate 58 has its output connected to "or" gate 53 and provides an output voltage which indicates a lack of parity when the number being checked has only five ones. The 1+ sensor which is connected to the complement source has its output connected directly to "or" gate 53 and provides a voltage output for indicating a lack of parity whenever the number being checked has seven ones. If the number being checked has two, four, or six ones no output is provided since these are valid numbers in an even parity checking system.

While several embodiments of the invention have been shown and described in detail for illustration purposes only, it is to be expressly understood that the invention is not to be limited thereto.

What is claimed is:

1. A circuit for determining when a binary coded electric signal fails to fall within a preselected group of odd integers comprising, a first group of sensors which change successively from one output state to another as the code being checked increases by integer steps connected in parallel for receiving the electric signal, a second group of sensors which change successively from one output state to another as the code being checked increases by integer steps connected in parallel for receiving the complement of the electric signal, logical circuit means for comparing the outputs of preselected sensors and gating said outputs when the sensor outputs being compared both occupy preselected output states, and means for combining the outputs from said sensors to provide a single output for indicating that the coded signal being checked fails to fall within the preselected group of odd integers.

2. A circuit for determining when a binary coded electric signal fails to fall within a preselected group of odd integers as defined in claim 1 in which the means for comparing the outputs of preselected sensors and gating said outputs when the sensor outputs being compared both occupy preselected output states includes an "and" gate with two inputs which are connected by two inverting amplifiers to the outputs of single sensors in the first and second group respectively.

3. A circuit for determining when a binary coded electric signals fails to fall within a preselected group of even integers comprising, a first group of sensors which change successively from one output state to another as the signal being checked increases by integer steps connected in parallel for receiving the coded electric signal, a second group of sensors which change successively from one output state to another as the signal being checked increases by integer steps connected in parallel for receiving the complement of the said coded electric signal, logical circuit means for comparing the outputs of preselected sensors and gating said outputs when the said sensor outputs being compared both occupy preselected dissimilar output states, and means for combining the outputs from said sensors to provide a single output for indicating that the coded signal being checked fails to fall within the preselected group of even integers.

4. A circuit for determining when a binary coded electric signal fails to fall within a preselected group of even integers as defined in claim 3 in which the means for comparing the outputs of preselected sensors and gating said outputs when they bear a preselected dissimilar relationship includes, an "and" gate, conductive means for connecting one input of said "and" gate to a first sensor, and an inverting amplifier for connecting the other "and" gate input to the second sensor whose output is to be compared with the first sensor output.

5. A circuit for determining when a binary coded electrical signal fails to fall within a preselected group of integers of one kind comprising, a plurality of sensors each of which has all of a group of binary bits impressed on its input in parallel, each sensor including means for producing a preselected output state when a different number of binary bits of one kind are impressed on its input, logical circuit means for comparing the outputs of preselected sensors and gating said outputs when the sensor outputs being compared both occupy preselected output states, and means for combining the outputs from said sensors to provide a single output for indicating that the coded signal being checked falls within the preselected group of integers of one kind.

6. A circuit for determining when a binary coded electrical signal fails to fall within a preselected group of integers of one kind as defined in claim 5 in which the means for comparing the outputs of preselected sensors and gating said outputs when they occupy preselected output states includes an "and" gate, conductive means for connecting one input of the "and" gate to the output of one sensor, and an inverting amplifier for connecting another input of the "and" gate to the output of another sensor whose output is to be compared to that of said one sensor.

References Cited in the file of this patent

UNITED STATES PATENTS

| | | |
|---|---|---|
| Re. 24,447 | Block | Mar. 25, 1958 |
| 2,675,538 | Malthaner et al. | Apr. 13, 1954 |
| 2,848,607 | Maron | Aug. 19, 1958 |
| 2,884,616 | Fillebrown et al. | Apr. 28, 1959 |
| 2,958,072 | Batley | Oct. 25, 1960 |
| 3,011,151 | Ketchledge | Nov. 28, 1961 |
| 3,025,508 | Merl et al. | Mar. 13, 1962 |
| 3,046,523 | Batley | July 24, 1962 |

FOREIGN PATENTS

| | | |
|---|---|---|
| 769,909 | Great Britain | Mar. 13, 1957 |

OTHER REFERENCES

IBM Technical Disclosure Bulletin, page 61, "Electric Decimal Comparison Circuit," P. E. Locke, vol. 3, No. 1, June 1960.